Figure 1:
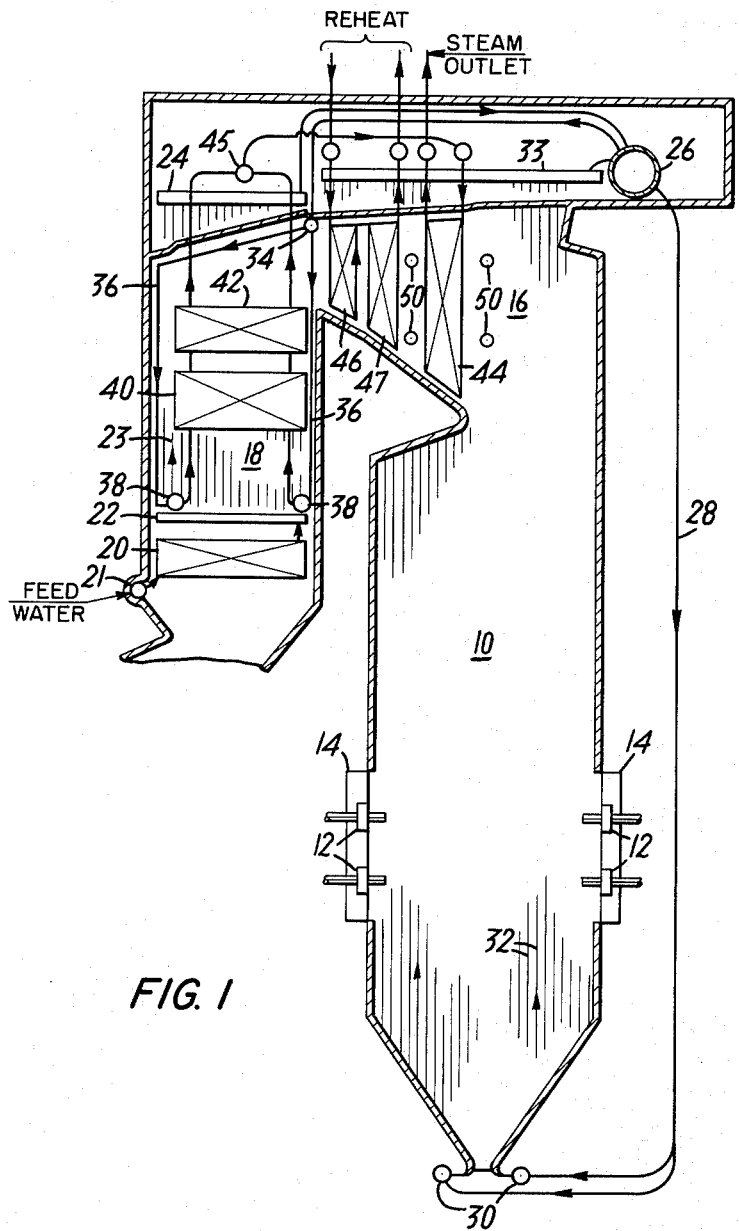

INVENTOR.
WHARTON NELSON

Feb. 15, 1966  W. NELSON  3,234,898
FURNACE OPERATION UTILIZING ADDITIVES OF A NEW AND
IMPROVED TYPE FOR RETARDING HIGH TEMPERATURE
CORROSION AND ASH BONDING
Filed March 8, 1963  2 Sheets-Sheet 2
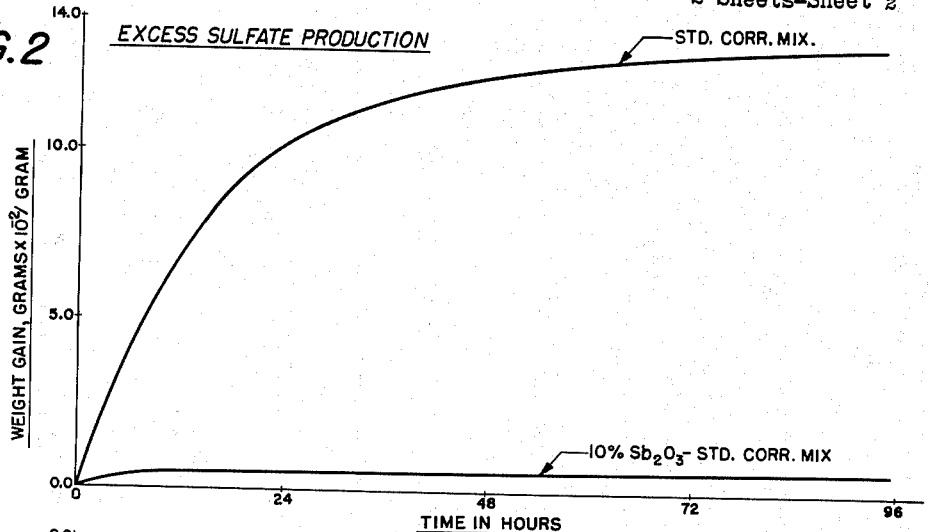
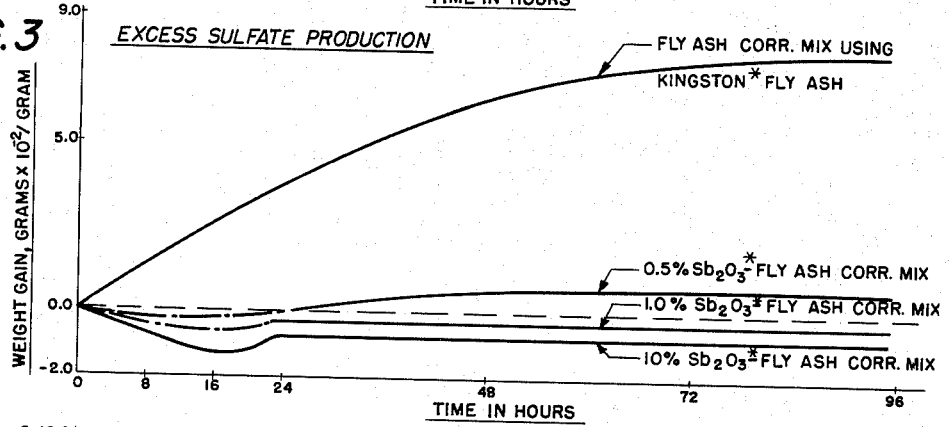
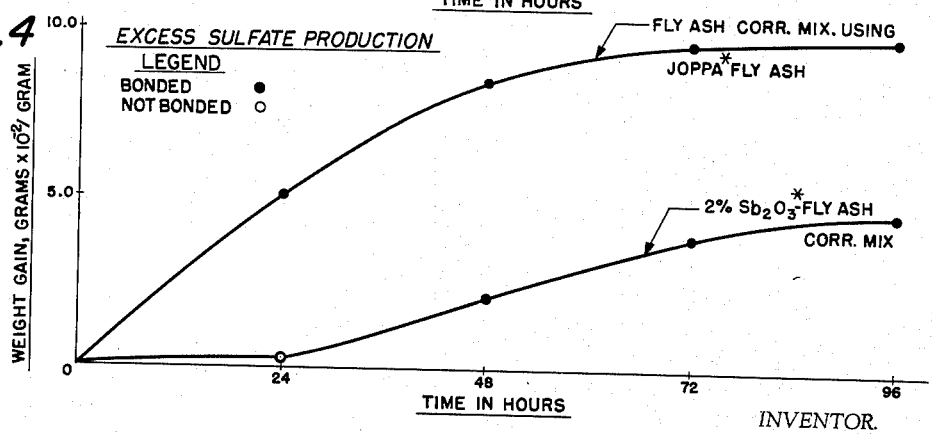
INVENTOR.
WHARTON NELSON
BY
his ATTORNEYS

United States Patent Office 3,234,898
Patented Feb. 15, 1966

3,234,898
FURNACE OPERATION UTILIZING ADDITIVES OF A NEW AND IMPROVED TYPE FOR RETARDING HIGH TEMPERATURE CORROSION AND ASH BONDING
Wharton Nelson, West Hartford, Conn., assignor to Combustion Engineering, Inc., Windsor, Conn., a corporation of Delaware
Filed Mar. 8, 1963, Ser. No. 265,007
8 Claims. (Cl. 110—1)

This is a continuation-in-part of my copending application Serial No. 244,117, filed December 12, 1962 (now abandoned).

This invention relates to a method for improved furnace operation, and in particular, to a method for reducing corrosion and fouling of heat transfer surfaces by ash deposits and sulfurous combustion products.

A problem of increasing importance in modern furnaces and high capacity steam generators in power plants is corrosion and fouling of tube surfaces due to the formation of a corrosive molten ash deposit. Formation of heavy deposits of ash by ash bonding is a particularly acute problem in furnaces where tube metal temperatures exceed 1000° F. It has been observed that a molten layer frequently develops adjacent to the tube surface which bonds other ash materials to the tube, resulting in heavy ash deposits. The ash deposits are a serious detriment to the heat transfer capacity of the furnace, and furthermore, the molten layer is highly corrosive to tube metals.

Still another problem, long recognized in the art, is the formation of sulfur trioxide in the combustion gases. It is known that significant amounts of sulfur trioxide are formed by the catalytic conversion of sulfur dioxide to sulfur trioxide by fly ash. Sulfur trioxide tends to condense in the cooler sections of the heat exchangers as sulfuric acid, seriously limiting the heat economy obtainable. Further, it participates in the corrosion of other heat transfer surfaces.

Accordingly, it is an object of this invention to provide a method of reducing ash bonding in furnaces.

It is a further object of this invention to provide a method of reducing corrosion in furnaces.

A particular object of this invention is to provide a method of reducing corrosion and fouling of tube surfaces having a temperature in excess of 1000° F.

It is a further object of this invention to provide a method of reducing corrosion by suppressing the formation of sulfur trioxide in furnaces.

According to the present invention these and other objects are achieved by providing for the presence of antimony or antimony compounds in the combustion products of a furnace. Also included within the method is contacting the high temperature tube surfaces with antimony or an antimony compound. While antimony trioxide is the preferred compound, any material which will form antimony trioxide under furnace conditions may be used. Such materials include, but are not limited to, antimony metal, antimony halides, antimony sulfides, stibnite, sodium antimonate and organic antimony compounds such as potassium antimony tartrate and other organo-antimony compounds. Antimony compounds, such as halides, are highly reactive when sprayed onto hot ash or tube surfaces or into the flue gas. They are probably almost instantly converted to the oxide at prevailing gas temperatures (approximately 1800° F.) in the furnace superheater area by the flue gas which contains about 4% uncombined oxygen.

All of the above materials may be used to reduce corrosion in furnaces. Certain antimony compounds, however, are especially desirable since, in addition to reducing corrosion, these also control ash bonding on high temperature surfaces. Particular antimony compounds which may be used to retard both corrosion and ash bonding include antimony trioxide and potassium antimony tartrate.

Antimony compounds may be supplied by a wide variety of methods. Blowing an antimony-containing dust or slurry through the soot blowers is particularly advantageous, and is the preferred method of introducing the antimony compounds. Alternatively, however, the metal, its alloys, or compounds may be admixed with the fuel or air and converted into antimony oxides by the combustion process, or may be supplied by blowing into the main combustion zone. In still another method the high temperature tubes are precoated with antimony or an antimony compound. A preferred method of adding antimony compounds is in the form of an aerosol dispersion or smoke. Such an aerosol may be generated by burning metallic antimony or by passing the somewhat volatile antimony trioxide through a suitable electric arc. The amount of antimony or its compounds which is required may vary widely, as corrosion and fouling in furnaces depend on the source of the fuel and the manner in which it is burned. Accordingly, it is not feasible to specify in advance the amount of antimony required under particular furnace conditions. The amounts of antimony used should be effective to reduce the corrosion and/or ash bonding significantly.

While the present invention is particularly applicable to coal fired furnaces, it is not to be so limited. Corrosion and sulfur trioxide formation may be suppressed by the method of the present invention in furnaces fired by other solid fuel such as lignite.

For a better understanding of this invention, reference may be had to the accompanying figures and diagrams in which:

FIGURE 1 schematically illustrates a steam generator to which the present method may be applied; and FIGURES 2 to 4 show laboratory measurements illustrating the practice of the present invention.

Referring to FIGURE 1, there is shown a typical steam generator having a combustion chamber 10 in which a solid fuel, such as pulverized coal, is burned. The fuel is introduced into the furnace by means of burners 12, while the combustion air enters through windboxes 14. The combustion gases generated pass upwardly through the chamber 10, through the horizontal gas pass 16, down through the vertical gas pass 18, and out the lower end thereof to the stack (not shown).

Feed water is supplied, by means of a header 21, to the heat economizer 20 where the water is heated to a certain extent. The heated water then flows to a header 22, through the tubes 23 to the outlet header 24, and from there to the steam and water drum 26.

Water from drum 26 flows through a downcomer 28 to the lower headers 30 which supply water to the tubes 32 lining the walls of combustion chamber 10. Most of the steam generation occurs in tubes 32. Leaving the top of tubes 32 is a mixture of steam and water which is returned to the drum 26 by an upper header 33.

The steam separates from the water and flows on to distribution header 34. The steam passes from the header 34 down through tubes 36 to the supply headers 38, and then to the primary superheaters 40 and 42. The superheated steam then flows to the final superheater section 44 by way of the header 45, and from there to a turbine (not shown).

Many modern turbines are designed with a plurality of stages. In order to prevent condensation in the lower pressure stages, and further to obtain the highest possible thermal efficiency, partially expanded steam is withdrawn from the high pressure stages of the turbine and returned to the furnace to be reheated. The reheated steam is used to drive the lower pressure stages of the turbine. In the furnace illustrated in FIGURE 1, reheater passes 46 and 47 in the gas pass 16 are provided for this purpose.

In a furnace, such as illustrated, gas-side corrosion and fouling is most severe on the high temperature tubes of the superheater 44 and reheaters 46 and 47. Steam outlet temperatures from these tubes may be in the range of 1000° to 1200° F., and the tube metal temperature may be as high as 1300° F. A substantial amount of the sulfur trioxide in the flue gas is formed in the superheater and reheater regions. A second zone where corrosion is important is in the economizer tubes 20. Because of the low temperatures existing in this region sulfur trioxide is condensed from the flue gases as liquid sulfuric acid.

In the preferred embodiment of the present invention, antimony or an antimony compound is applied by blowing a suspension thereof through soot blowers 50 onto the tubes of the superheater 44 and reheater 47. Application is made as required by the furnace conditions.

By following the method of the instant invention the formation of corrosive molten ash deposits in the superheater 44 and reheaters 46 and 47 is suppressed. The reduction in fouling is a further important advantage accruing from the present invention. Additionally, by reducing the formation of $SO_3$, corrosion in other portions of the furnace, such as the heat economizer 20, which is the result of $SO_3$ in the flue gases, is also reduced.

Although the present invention is not to be limited by any theory, the following explanation is helpful in understanding the invention more fully and particularly in understanding the mechanism by which antimony trioxide or potassium antimony tartrate or sodium antimonate improve the furnace operation. Ash and ash deposits in boilers have been extensively studied. Fly ash compositions normally have softening temperatures of over 1800° F. Typically ash will consist of the oxides of silicon, iron, aluminum, alkali and alkaline earth metals. A portion of the alkali and alkaline earth metals is present as the sulfate; however in the usual case there are more than enough alkali and alkaline earth oxides present to react with the $SO_3$ in the ash.

Ash deposits, by contrast, have a layered structure of a varying composition. The outermost portions of the deposit are friable and substantially like fly-ash. These comprise the mineral portions of the coal and its sulfurous reaction products. Underlying the outermost portion, and lightly bonded thereto are a hard reddish layer and a soft, white, water-soluble material containing substantial amounts of $SO_3$ in excess of that required to react with the alkali and alkaline earth oxides present. It has been established that the excess sulfate is present as a complex sulfate of the formula

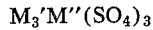

wherein M′ is sodium or potassium and M″ is iron or aluminum. Mixtures of the complex sulfates are molten at a temperature of 1000° to 1300° F. The complex sulfates are the principal molten compounds which bond the ash deposit to the tube surface. Immediately adjacent to the tube surface is a hard, black scale composed of oxides and sulfides. This scale represents the corrosion products resulting from the attack of the molten ash deposits on the tube metal.

Sulfur trioxide is normally present in the flue gas in small quantities (less than 0.005%). However, the gas phase concentration required for formation of complex sulfates according to the equation

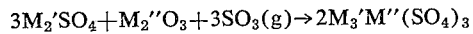

is higher than obtained in ordinary flue gas (e.g. 0.025% $SO_2$ is required to form $K_3Fe(SO_4)_3$ at 1000° F.). Accordingly, it has been demonstrated that, under furnace conditions and in the absence of catalytic materials, such sulfates will not form.

It is known that the iron oxide in the ash will catalytically convert $SO_2$ to $SO_3$. In the vicinity of the catalytic iron oxide, therefore, localized higher concentrations of $SO_3$ exist, which are sufficient to permit the formation of complex sulfates.

For a further understanding and detailed explanation of the ash deposit structure and corrosion mechanism reference may be had to the paper by Wharton Nelson and Carl Cain, Jr., entitled "Corrosion of Superheaters and Reheaters of Pulverized-Coal-Fired Boilers," Transactions of the ASME, July 1960, page 194, and the paper by Carl Cain, Jr., and Wharton Nelson entitled "Corrosion of Superheaters and Reheaters of Pulverized-Coal-Fired Boilers II," Transactions of the ASME, October 1961, page 468.

As stated, it has been discovered that corrosion and the formation of molten ash deposits are suppressed by the presence of antimony compounds. The antimony is believed to poison the catalytic activity of the iron oxide in the ash. By inhibiting the formation of $SO_3$, the formation of the complex sulfates is suppressed. A corrosive ash deposit, therefore, does not form on the high temperature tube surfaces. A further beneficial result accruing from the catalyst poisoning activity of the antimony compounds is that the dew point of the flue gases is lowered. Accordingly, greater heat economy is possible.

The ability of antimony containing compounds to suppress sulfur trioxide formation is greatest at temperatures below about 1200° F. Antimony trioxide, because of its relatively high volatility and tendency to oxidize to the relatively inert and non-volatile higher oxides, is less effective at higher temperatures. Apparently, it is volatilized from and oxidized on the surface of the catalytic $Fe_2O_3$.

Because the antimony compounds poison the catalytic activity of the iron oxide, they may be more effective when applied in the form of an aerosol or a gas. The catalytically active sites on a particle of ash are believed to be in the pore structure of the ash. Sintered, or vitrified ashes are substantially less active than porous ashes in converting $SO_2$ to $SO_3$. By applying the antimony in an extremely fine state of subdivision, the antimony is better able to penetrate the ash pore structure and reach the catalytically active sites.

The method according to the present invention is further illustrated by the following examples.

In order to determine the efficacy of corrosion retardants in tests of a reasonable time duration, corrosion conditions existing in a furnace such as illustrated in FIGURE 1 were simulated in laboratory scale equipment. A standard corrosion mixture consisting of iron oxide, sodium sulfate and potassium sulfate in a mole ratio of 1.0:1.5:1.5 respectively, was prepared. The corrosion mixture was placed in a suitable porcelain boat, and a test sample of stainless steel was immersed therein. The boat was then placed in a muffle furnace and heated to a temperature in the range of 1000° to 1300° F. A synthetic flue gas was prepared corresponding to the flue gas obtained when burning East Tennessee coal in the presence of 20% excess air. The gas is prepared by premixing oxygen, nitrogen, carbon dioxide and sulfur dioxide. The synthetic flue gas composition is set forth in Table I.

TABLE I

| Gas-component: | Volume, percent |
|---|---|
| Carbon dioxide | 15 |
| Oxygen | 3.6 |
| Sulfur dioxide | 0.25 |
| Nitrogen | 81.15 |

This test substantially duplicates the formation of a corrosive molten ash deposit on boiler tubes by the catalytic conversion of $SO_2$ to $SO_3$ and the formation of corrosive complex sulfates from iron oxide and alkali sulfates as described above. Because the molten complex is much more concentrated in the laboratory test than it is in actual boiler, its corrosiveness is increased by many fold. In the laboratory very substantial corrosion occurs in a period of ten days. By contrast in a typical boiler furnace complex sulfates do not exist in significant quantities for ten to twenty days, and a period of a month or more is required to obtain reliable measurements on corrosion.

In the laboratory test it was found that the flow rate of the synthetic flue gas was a significant variable in affecting the formation of complex sulfates. A series of tests showed that at low flow rates the complex sulfate formation was slow, but as the flow rate was increased to about 250 to 300 ml./min. in the 1″-diameter tubes used in the muffle furnaces, the sulfate formation rate stabilized. Throughout the examples hereinafter described a flow rate of 300 ml./min. was used, at which rate the sulfate formation was substantially unaffected by small errors in flow rate measurement.

*Example I*

Using the foregoing laboratory procedure, the corrosion of type 321 stainless steel was measured using various antimony corrosion retardants. Corrosion measurements were made using the above described standard corrosion mix containing 5% to 10% of each of several antimony compounds based on the weight of the corrosion mix. The amount of corrosion occurring in a 10-day test with the temperature at 1100° F. was compared with the corrosion observed when no corrosion retardant was present. The data obtained are set forth in Table II.

TABLE II

EFFECT OF ANTIMONY COMPOUNDS ON CORROSION

| Material | Concentration (percent of corrosion mix) | Percent Corrosion Reduction |
| --- | --- | --- |
| Antimony Trioxide | 10 | 95 |
| Antimony Potassium Tartrate | 10 | 90 |
| Sodium Antimonate | 10 | 97 |
| Antimony Metal | 5 | 87 |
| Antimony Trisulfide | 5 | 93 |

*Example II*

The effect of varying amounts of antimony trioxide was determined using the same procedure as described in Example I. The data are set forth in Table III.

TABLE III

EFFECT OF ANTIMONY CONCENTRATION ON CORROSION RATE

Concentration: Corrosion rate [1]
  10% _____ 0.10
  5% _____ 0.12
  1% _____ 1.7
  0 _____ 1.8

[1] Grams per square inch in 10 days at 1100° F.

The corrosion rate in a furnace depends on the fuel and the manner in which it is burned. The amount of antimony required in the corrosive molten ash layer in a particular case to inhibit corrosion effectively may be conveniently estimated by the foregoing laboratory test. In testing the corrosiveness of a given ash, the iron oxide of the standard corrosion mix is replaced by an equal weight of ash from the fuel to be burned. The antimony/iron ratio should be sufficient to reduce the corrosiveness of the ash-sulfate mixture to less than 50% of the value observed when a tube metal sample is tested in a plain ash-sulfate mixture during a ten day corrosion test.

As described above, the ash deposit has a layered structure, the complex sulfate occurring principally in the inner layers. The antimony oxide is preferably concentrated in these layers to achieve maximum effectiveness. However, even the additive in deposits further removed from the tube may have some effect in reducing corrosion.

*Example III*

As an alternative to measuring the corrosion rate of a metal coupon immersed in a test corrosion mix, the effectiveness of the antimony compounds in poisoning the catalytic activity of iron oxide may be measured by determining the amount of complex sulfate formed during the above described corrosion test procedure. When determining the amount of sulfates formed, the corrosion mix, i.e., iron oxide and alkali sulfates are prepared in powdered form and packed into a suitable ceramic boat. A test metal coupon is not required in this test.

The boat containing the corrosion mix is inserted into a laboratory muffle furnace and maintained at the test temperature while the standard flue gas is passed over the composition. The increase in weight (due to $SO_3$ absorption) is determined as a function of time. Typical results are set forth in FIGURE 2 which shows the weight gain in hundredths of a gram per gram of standard corrosion mix (i.e., iron oxide, sodium sulfate and potassium sulfate in a mole ratio of 1:1.5:1.5). In FIGURE 3 the results of a similar experiment are shown in which the iron oxide of the standard corrosion mix was replaced with an equal weight of Kingston fly ash. Weight losses with 1 and 10% $Sb_2O_3$ were due to volatilization of excess $Sb_2O_3$. Kingston fly ash is that from burning pulverized East Tennessee coal in boilers of the Kingston steam plant of the Tennessee Valley Authority. Ash deposits created from it are highly corrosive. Also shown in FIGURES 2 and 3 is the effect of the presence of antimony oxide on the rate of sulfate formation in each corrosion mix.

In regard to all three of the examples set forth immediately above, it further is to be observed that no ash bonding occurred in any of these mixtures containing antimony trioxide, even after a 96-hour exposure; the ash deposits then resulting being non-corrosive and capable of easy brush-away removal through use of a camel's hair brush. By contrast, the unhibited standard corrosion mixtures of FIGURE 2 and the fly ash corrosion mixture designated in the upper portion of FIG. 3 bonded firmly after only 48 hours into an ash deposit structure that was hard and crystalline.

Such reduction in ash bonding is an advantage of high practical significance. This is because in an operating furnace an ash deposit of the "unbonded" type yielded by the novel additive materials can easily be removed by normal soot-blowing methods while the furnace continues to run. By contrast a bonded deposit can be removed only during furnace shut-down, and removal then requires either manual peening (striking sharply with a hammer) or prolonged water washing, both of which are costly and time consuming.

Moreover, the build-up of such bonded ash deposits upon the steam-carrying tubes significantly cuts down the flow of heat from the combustion gases into the tube-carried steam, with resultant requirement that in the past such tubes have had to be designed to provide more heat-transfer surface than actually would be needed if the furnace could be operated with those tubes free of bonded ash deposits. The improved additive materials of the present invention open the way for designing furnaces with less excess surface in the mentioned tubes than has been permitted in the past.

Such superior additive materials also open the way for a successful burning of coals having a pronounced tendency to form heavy deposits of ash which rather quickly block flow of combustion gas through the tube bundles. Heretofore such coals had been excluded from use because of this rapid-fouling tendency.

*Example IV*

The procedure of Example III was repeated using equimolar portions of sodium and potassium sulfate together with and in which a sample of Joppa fly ash replaced the iron oxide of the standard corrosion mix as explained above. Joppa fly ash is that from burning pulverized Western Kentucky and Southern Illinois coal at the Joppa plant in Illinois of the Electric Energy, Inc. Ash deposits created from it are the most corrosive known. The excess sulfate production as measured by the test during a 96-hour period is set forth in FIGURE 4. As indicated during the first 24-hour period corrosion and ash bonding were completely suppressed. During the balance of the test period, there was some $SO_3$ formation and some concomitant ash bonding. However at all times strength of the ash bonding observed with the inhibited corrosion mixture was less than in corresponding unhibited samples.

I claim:

1. In a furnace burning a solid fuel, a method of improving furnace operation comprising contacting at least some surfaces in said furnace at temperatures between about 1,000° and 1,300° F., with a suspension of a material consisting essentially of compounds selected from the group consisting of antimony, antimony oxides, and compounds which produce antimony oxides under furnace conditions, by injecting said suspension into the combustion products within said furnace adjacent to and immediately upstream of said surfaces.

2. A method according to claim 1 comprising providing for the presence of a corrosion retarding material consisting essentially of antimony trioxide in the combustion products of said furnace.

3. A method according to claim 1 comprising providing for the presence of a corrosion retarding material consisting essentially of potassium antimony tartrate in the combustion products of said furnace.

4. A method according to claim 1 comprising providing for the presence of a corrosion retarding material consisting essentially of antimony trisulfide in the combustion products of said furnace.

5. A method according to claim 1 comprising providing for the presence of a corrosion retarding material consisting essentially of antimony in the combustion products of said furnace.

6. A method according to claim 1 comprising providing for the presence of a corrosion retarding material consisting essentially of sodium antimonate in the combustion products of said furnace.

7. A method of reducing the corrosion of surfaces in a furnace at temperatures between about 1000° and 1300° F. by the combustion products of solid fuels comprising blowing a corrosion retarding material consisting essentially of compounds selected from the group consisting of antimony, antimony oxides and compounds which produce antimony oxides under furnace conditions into said furnace through the soot blowers thereof which are adjacent to and immediately upstream of said surfaces.

8. A method of reducing the corrosion of surfaces at temperatures between about 1,000° and 1,300° F. caused by the combustion products of solid fuels comprising contacting said surfaces with an aerosol suspension of a material consisting essentially of compounds selected from the group consisting of antimony, antimony oxides, and compounds which produce antimony oxides under furnace conditions by injecting said aerosol suspension into the combustion products within said furnace adjacent to and immediately upstream of said surfaces.

References Cited by the Examiner

UNITED STATES PATENTS

| | | | |
|---|---|---|---|
| 2,673,145 | 3/1954 | Chandler | 110—1 |
| 2,742,351 | 4/1956 | Rudel | 44—67 |
| 2,935,956 | 5/1960 | Welch | 110—1 |

FOREIGN PATENTS 705,176    3/1954    Great Britain.

OTHER REFERENCES

Publication: "Removal of Soot From Furnaces and Flues by the Use of Salts or Compounds," Bureau of Mines Bulletin 360, published 1932, table 5, page 19; table 8, page 49, and reference to Test 6a, page 50.

FREDERICK L. MATTESON, JR., *Primary Examiner.*

FREDERICK KETTERER, JAMES W. WESTHAVER,
*Examiners.*